United States Patent
Burns et al.

(10) Patent No.: US 7,365,881 B2
(45) Date of Patent: Apr. 29, 2008

(54) HALFTONE DOT-GROWTH TECHNIQUE BASED ON MORPHOLOGICAL FILTERING

(75) Inventors: Peter D. Burns, Fairport, NY (US); Gustav J. Braun, Fairport, NY (US); Kurt M. Sanger, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 916 days.

(21) Appl. No.: 10/223,228

(22) Filed: Aug. 19, 2002

(65) Prior Publication Data
US 2004/0032600 A1 Feb. 19, 2004

(51) Int. Cl.
G06K 15/00 (2006.01)

(52) U.S. Cl. ............... 358/3.06; 358/3.11; 358/3.12; 358/3.09; 358/3.3; 358/1.9; 358/518; 358/534; 358/3.21; 358/3.26; 358/3.27; 382/257; 382/260; 382/261; 382/275

(58) Field of Classification Search .......... 358/1.9, 358/518, 534, 3.3, 3.12, 3.06, 3.11, 3.09, 358/3.21, 3.26–3.27; 382/257, 260, 261, 382/275
See application file for complete search history.

(56) References Cited

U.S. PATENT DOCUMENTS

| 4,630,125 A | 12/1986 | Roetling |
| 5,208,871 A | 5/1993 | Eschbach |
| 5,250,934 A | 10/1993 | Denber et al. |
| 5,255,085 A | 10/1993 | Spence |
| 5,258,854 A * | 11/1993 | Eschbach .................... 358/445 |
| 5,293,539 A | 3/1994 | Spence |
| 5,483,351 A | 1/1996 | Mailloux et al. |
| 5,537,485 A * | 7/1996 | Nishikawa et al. ......... 382/130 |
| 5,579,445 A * | 11/1996 | Loce et al. .................. 358/1.2 |
| 5,677,093 A | 10/1997 | Delabastita et al. |
| 5,680,485 A | 10/1997 | Loce et al. |
| 6,115,140 A * | 9/2000 | Bresler et al. ............... 358/1.9 |
| 6,297,889 B1 * | 10/2001 | Loce et al. .................. 358/1.9 |
| 6,775,399 B1 * | 8/2004 | Jiang .......................... 382/128 |
| 2001/0005270 A1 * | 6/2001 | Wechgeln ................... 358/406 |
| 2002/0164077 A1 * | 11/2002 | Lee et al. ................... 382/224 |
| 2003/0218780 A1 * | 11/2003 | Braun et al. .............. 358/3.12 |

OTHER PUBLICATIONS

Rafael C. Gonzalez, Richard E. Woods, "Digital Image Processing", Jan. 15, 2002, Prentice-Hall, Inc. 2nd Edition, Chapter 9, p. 519-560.*

* cited by examiner

Primary Examiner—Twyler Lamb
Assistant Examiner—Jacky X. Zheng
(74) Attorney, Agent, or Firm—William F. Noral

(57) ABSTRACT

A method for converting an original halftone bitmap image to a color converted halftone bitmap image. A set of asymmetrical morphological filters is provided. The original halftone bitmap image is segmented into blocks and for each block: apply the set of morphological filters to the original halftone bitmap image to produce a set of modified halftone bitmap images; estimate the percent dot area of the original halftone bitmap image and the set of modified halftone bitmap images; a predetermined dot-gain to the percent dot area of the original halftone bitmap image to produce a modified percent dot area; select the modified halftone bitmap image whose percent dot area is closest to the modified percent dot area to produce a block of the color corrected halftone bitmap image; and replace the original halftone bitmap image with the combined blocks of selected modified halftone bitmap image.

7 Claims, 6 Drawing Sheets

| COEFFICIENTS |
|---|
| .0002 |
| .0019 |
| .0110 |
| .0430 |
| .1142 |
| .2051 |
| .2493 |
| .2051 |
| .1142 |
| .0430 |
| .0110 |
| .0019 |
| 0.0002 |

FIG. 3

ORIGINAL, O    $B_1 = EX[O, s_1]$ $B_1$    $B_2 = EX[B, s_2]$

HALFTONE DOT-GROWTH TECHNIQUE BASED ON MORPHOLOGICAL FILTERING

FIELD OF THE INVENTION

This present invention relates in general to digital halftoning imaging systems and more particularly to a digital halftone dot-growth technique based on morphological filtering.

BACKGROUND OF THE INVENTION

Digital halftoning refers to any algorithmic process that creates the illusion of continuous-tone images from the judicious arrangement of binary picture elements (pixels).

RIPing (Raster Image Processing) is the digital image processing technique that takes a continuous-tone image and original graphical elements and provides a binary halftoned output image file. RIPing an image file usually can include the steps of spatial filtering, interpolation, tone and color modification, and digital halftoning.

There is a need to control the size of the dots in a pre-existing halftone bitmap. This bitmap could have been generated by a digital screening system (i.e., a RIP) or it could have been generated by scanning an optical piece of film to create a digital bitmap file. In general, these bitmap files were created with some output device in mind. As such, the dot pattern was created to produce a given density to dot percentage relationship tailored to the target output device. If this bitmap file were printed on an output device that had different dot-gain characteristics than the target device the density as a function of dot-area percentage will be different. Thus, in order to achieve the desired dot percentage to output density relationship of the target device, on a different device, the bitmap file for the target device must be modified according to the dot-gain differences between the target device and the given output device.

For most traditional digital-proofing scenarios this dot-gain compensation is done by re-RIPing the original art with a modified dot-gain curve. This modified dot-gain curve accounts for the dot-gain differences between the target device and the proofing system. Thus, a custom bitmap file needs to be generated for each output device. The main drawback to this paradigm is that the proofs may be made on systems that do not use the same screening technology as was used to create the target bitmap file. Thus, in order to support a RIP-once-output-many (ROOM) workflow the dot-gain compensation needs to be applied to the bitmap file directly.

Bitmap files can consist of single channel bitmaps such as those for a single color device (e.g., a black-and-white laser printer), those for a four-color (e.g., CMYK) output device (e.g., a printing press or a graphic-arts proofer), or any output device that utilizes bitmap files of any number of channels (e.g., a multi-ink inkjet printer).

Several approaches for dot-gain modification of bitmaps have been proposed. The dot gain may be adjusted for each of the primary colors cyan, magenta, yellow, and black. A description for how to do this is disclosed by Spence in U.S. Pat. Nos. 5,255,085 and 5,293,539 titled "ADAPTIVE TECHNIQUE FOR PROVIDING ACCURATE TONE REPRODUCTION CONTROL IN AN IMAGING SYSTEM" and "METHOD AND APPARATUS FOR CALIBRATING TONE REPRODUCTION IN A PROOFING SYSTEM". Here, percent dot area is calculated using the Murray and Davies equation from measured densities.

Denber, et. al. disclose a method of shifting and ANDING a bitmap image with itself to thin the image displayed in U.S. Pat. No. 5,250,934 "METHOD AND APPARATUS FOR THINNING PRINTED IMAGES" and also teaches a method of setting a bit to an intermediate level if it is diagonally between two active bits using shifting, logical AND, and a logical OR operation.

Mailloux, et al. discloses using a 4×4 input to a lookup table to determine how to operate on the central 2×2 pixels to implement halfbit or fullbit dilation and erosion in U.S. Pat. No. 5,483,351 titled "DILATION OF IMAGES WITHOUT RESOLUTION CONVERSION TO COMPENSATE FOR PRINTER CHARACTERISTICS". This requires knowing some of the surrounding pixels when deciding how to dilate or erode the pixels in the center.

Eschbach teaches in U.S. Pat. No. 5,258,854 titled "CONVERTING BETWEEN WRITE-WHITE, WRITE-BLACK, AND NEUTRAL BITMAPS", how to resize bitmap images in small amounts less than one full bit in size. Eschbach states that the erosion and dilation may be by differing amounts in the x and y directions, and that the amount of resizing may be a fraction of a full pixel.

Loce, et al. teaches logically combining two morphological filter pairs and an original image to create an output image in U.S. Pat. No. 5,680,485 titled "METHOD AND APPARATUS EMPLOYING EROSION-BASED FILTER PAIRS FOR IMAGE MAPPING". The morphological filters described are erosion filters, one of which has less erosion than desired and the other having more erosion than desired. Logically combining the original image with two eroded images provides for a method of obtaining an intermediate result.

Eschbach describes a method of resizing an input bitmap in U.S. Pat. No. 5,208,871 titled "PIXEL QUANTIZATION WITH ADAPTIVE ERROR DIFFUSION". Eschbach simulates a scan of an output image from an input bitmap such that the scan resolution is different from the input bitmap. Error diffusion is utilized to quantize the output bitmap into the desired output bit resolution. This example uses error diffusion to spread out the error in the quantization of a multilevel pixel into a reduced number of output states.

U.S. Pat. No. 6,115,140, title "Method and System for Half Tone Color Conversion", inventors Bresler and Nosko, issued Sep. 5, 2000 teaches using a descreened version of an original image, dilated and eroded versions of the original image to select a combination of the original, dilated, and eroded image to effect a dot gain or tone scale change in an input bitmap image. The patent discloses an original halftone image, an eroded version (HE), and two dilated versions (HD1 and HD2). Then a weight based on descreened versions of the original halftone (CO), the color corrected original (CI), the eroded original (CE), and the two dilated originals (CD1 and CD2) is calculated. The descreened images are used to select which of the four halftone images are transferred into H1 and H2. The weighting function is then used to merge bitmap versions of H1 and H2 together into the tone scaled output bitmap (HO). How to descreen is not disclosed, nor exactly how to calculate which bit of H1 and H2 is used to drive the output bit HO. The need to use error diffusion to distribute the error in selecting between H1 and H2 is not mentioned. Dilation is described as growing a single pixel completely around the halftone feature. A second dilation grows two pixels completely around the halftone feature. Similarly, erosion subtracts a single pixel completely around the halftone feature. This patent fails to teach how to perform descreening.

U.S. Pat. No. 4,630,125, titled UNSCREENING OF STORED DIGITAL HALFTONE IMAGES, inventor Roetling also states that "A partial solution known in the art is to spatially filter the halftone image with a low pass filter." Roetling teaches that the spatial filter method is not an exact method as it tends to blur the original image.

SUMMARY OF THE INVENTION

According to the present invention, there is provided a solution to these problems.

According to a feature of the present invention, there is provided a method for converting an original halftone bitmap image by a predefined color correction function to a color converted halftone bitmap image by morphological filtering of the original image to compensate for tone and color reproduction characteristics comprising:

providing an original halftone bitmap image;

providing a set of asymmetrical morphological filters that have the property that when they are applied recursively in order, the features in the halftone bitmap image are dilated or eroded by varying amounts by extending or reducing the edges first in one direction, then in two directions, etc.;

segmenting the original halftone bitmap image into blocks and for each block:

applying said set of morphological filters to said original halftone bitmap image to produce a set of modified halftone bitmap images;

estimating the percent dot area of the original halftone bitmap image and the set of modified halftone bitmap images;

applying a predetermined dot-gain color conversion to the percent dot area of the original halftone bitmap image to produce a modified percent dot area;

selecting the modified halftone bitmap image whose percent dot area is closest to the modified percent dot area to produce a block of the color corrected halftone bitmap image; and replacing said original halftone bitmap image with the combined blocks of selected modified halftone bitmap image.

ADVANTAGEOUS EFFECT OF THE INVENTION

The invention has the following advantages.

1. The invention provides an efficient technique for adjusting the dot sizes of bitmap image files such that the color and tone of the bitmap (binary image) can be adjusted prior to printing. These bitmap files can consist of single channel bitmaps such as those for a single color device (e.g., a black-and-white laser printer), those for a CMYK output device (e.g., a printing press or a graphic-arts proofer), or any output device that utilizes bitmap files of any number of channels (e.g., a multi-ink inkjet printer).

2. Another advantage of the present invention is the use of a set of asymmetrical morphological filters results in reduced rounding errors, when compared with standard erosion and dilation operations, which use larger, symmetrical morphological filters. In the present invention, the color and tone of the bitmap files are adjusted by increasing or decreasing the effective percent dot (image signal) using morphological filtering and selection operations.

3. Yet another advantage is the error diffusion of the remaining rounding errors between adjacent image blocks reduces the visibility of the remaining rounding errors. The technique estimates the local input image (dot percentage) level and finds the desired aim from the dot-gain transformation. The amount that a given dot percentage needs to grow or shrink is defined by a dot-gain curve, which defines the intended tone-or color-reproduction modification. The features of the input bitmap image are modified accordingly, using specific morphological structuring elements. The bitmaps, together with the original input form the candidate bitmap set. Estimates of the resulting local image signal for each of this set are computed, and compared with the aim signal level. The bitmap whose signal level is closest to the aim level is chosen, and the associated rounding error is stored. This error is subtracted from the aim signal level for the next local image area (block) in an error diffusion computation.

4. Yet another advantage is that the halftone bitmap file can be color-corrected without having access to the original continuous-tone image (e.g., scan of photographic film) or artwork. For most traditional digital proofing scenarios, this dot-gain compensation is done by re-RIPPING the original art with a modified dot-gain curve. This modified dot-gain curve accounts for the dot-gain differences between the target device and the proofing system. Thus, a custom bitmap file needs to be generated for each output device. The main drawback to this paradigm is that the proofs may be made on systems that do not use the same screening technology as was used to create the target bitmap file. Thus, in order to support a RIP-once-print-many workflow, the dot-gain compensation needs to be applied to the bitmap file directly.

BRIEF DESCRIPTION OF THE DRAWINGS

FIG. 3 is a diagrammatic view of example filter coefficients for the (row and column) filter vectors $F_H$ in (635) and $F_Y$ in (645) used in the filter-and-downsampling operations of FIG. 2.

DETAILED DESCRIPTION OF THE INVENTION

The present invention offers an efficient technique to adjust the dot sizes of bitmap image files such that the color and tone of the bitmap (binary image) files can be adjusted prior to printing.

These bitmap files can consist of single channel bitmaps such as those for a single color device (e.g., a black-and-white laser printer), those for a CMYK output device (e.g., a printing press or a graphic-arts proofer), or any output device that utilizes bitmap files of any number of channels (e.g., a multi-ink inkjet printer).

In the present invention, the color and tone of the bitmap files are adjusted by increasing or decreasing the effective percent dot (image signal) using morphological filtering and selection operations.

The main purpose of the present invention is to control the size of the dots in a pre-existing halftone bitmap. This bitmap could have been generated by a digital screening system (i.e., a RIP) or it could have been generated by scanning photographic film to create a digital bitmap file. In general, these bitmap files were created with some output device in mind. As such, the dot pattern was created to produce a given dot percentage vs. optical density (or lightness, etc.) characteristic that was tailored to a particular output device. If this bitmap file were printed on an output device that had different dot-gain characteristics than the target device, the density as a function of dot-area percentage will be different. Thus, in order to achieve the desired color and tone reproduction on a different device, the bitmap file for the target device must be modified according to the dot-gain differences between the target device and the given output device.

Figure 1:
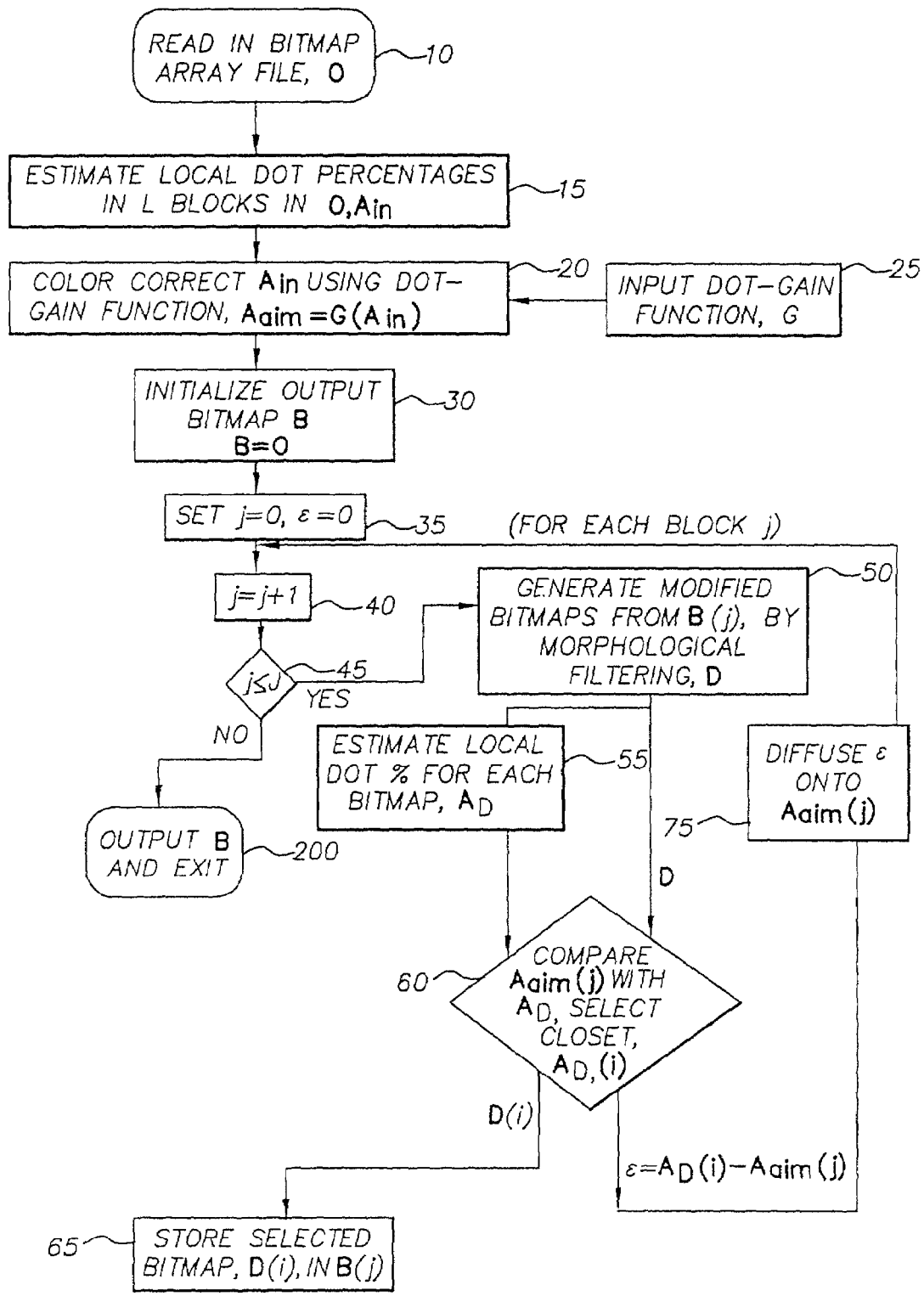
FIG. 1 is a general flow diagram of the method of the present invention.

A high-level flow diagram for an embodiment of the method of the present invention is shown in FIG. 1. As shown, an original halftone bitmap image file is provided (10). The image is processed in blocks smaller than the total bitmap size (15). Preferably, these blocks correspond to approximately the halftone cell size of the halftone screen used to create the bitmap. The dot-area percentage of these blocks is estimated (15) using a low-pass filter, decimation, and interpolation process. This process is shown in greater detail in FIG. 3. The estimated dot-percentages for the original bitmap ($A_{in}$) are converted to aim dot percentages $A_{aim}$ using the dot-gain curve (25) dictating the amount of gain required for the given input dot percentage (20). (An example dot-gain function is shown in FIG. 4). Note: It is understood that this function could take on different forms).

Referring again to FIG. 1, an output bitmap (B) is initialized (30) to be equivalent to the input bitmap (O). (Note: The output bitmap has the same number of pixels as the input bitmap). The output bitmap B is adjusted in a sequential manner by processing each ($j^{th}$) block (35). Thus a conditional loop, controlled by j, is started in (40) to process each block in B.

Several modified bitmap arrays are generated by morphologically filtering B(j) (50). The estimation of the percent dot (mean signal) is done for each modified array (55) in the same way that was done in (15). The set of signal values $A_D$ are compared with $A_{aim}$ in (60) by computing a set of difference values. The bitmap whose associated difference value is the minimum is chosen for storage in B(j) (65). The minimum difference is taken as the rounding (or selection) error and used in an error diffusion step (75). Here a portion of the error value is subtracted from the $A_{aim}$ values of neighboring image blocks. The loop is repeated as long as j is less than J (45). When j=J, the complete modified bitmap, B, is stored (200).

Figure 2:
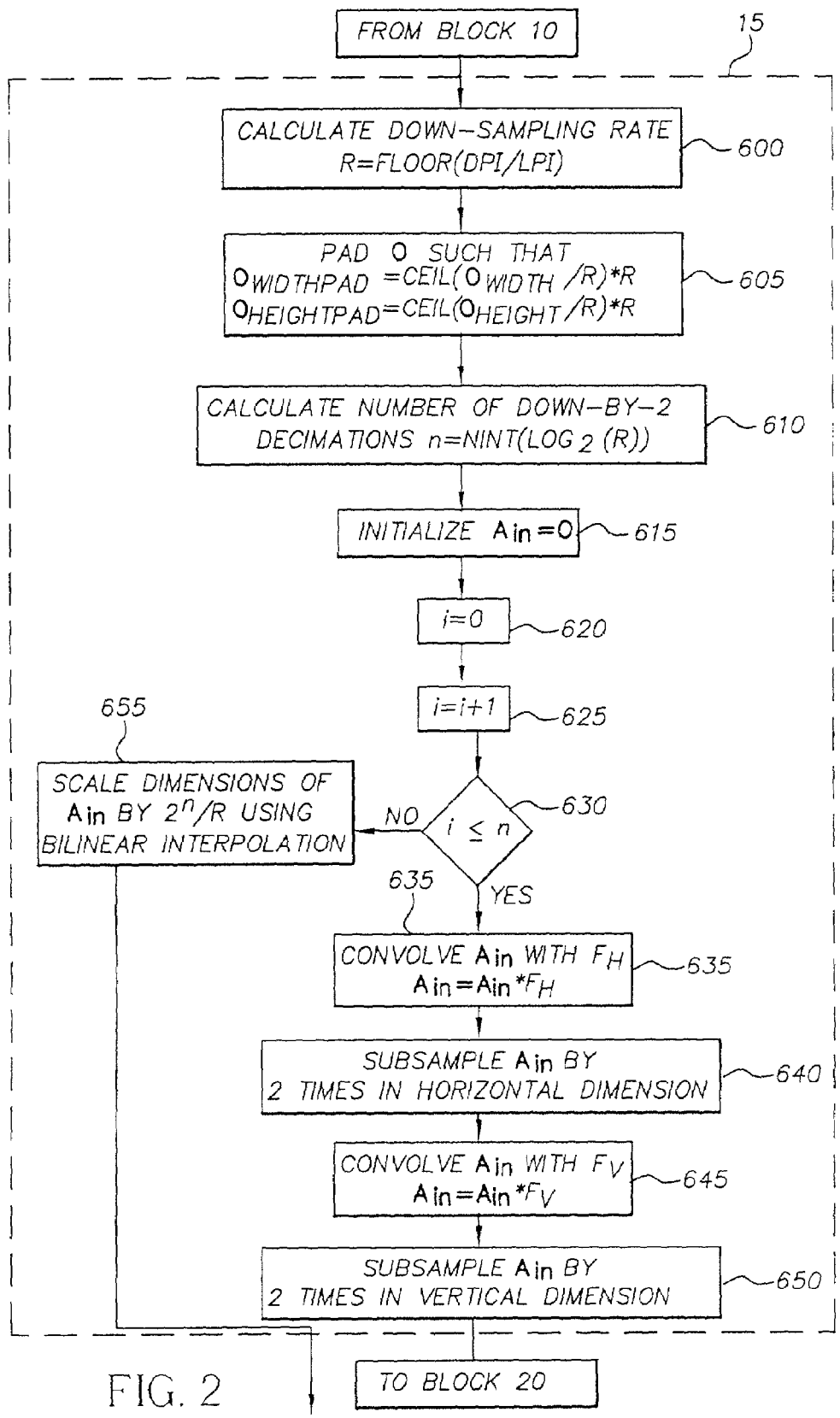
FIG. 2 is a flow diagram of the method of local dot percentage estimation and block generation.

Referring to FIG. 2, the process of estimating the local area dot percentages of the original bitmap (O) consists of a low-pass filtering and sub-sampling O (15). First a down-sampling factor R is calculated based on the ratio of the binary pixel frequency in dots-per-inch dpi and the halftone-screen frequency in lines-per-inch lpi of the bitmap O (600). (This relationship is one example of a process used to specify the down-sampling rate (R) in practice a different criterion could be used to set this value). The original bitmap is padded to be an integer multiple of the down-sampling rate (605). The process used to create the local area dot percentages uses down-by-two decimations followed by a final bilinear interpolation. Each down-by-two decimation stage corresponds to a down-sampling rate of 2. Thus there are, $\log_2(R)$ down-by-two decimations in R. By definition the number of down-by-two decimations needs to be an integer. Thus, the number of down-by-two decimations (n) is calculated by (610):

$$n = NINT(\log_2(R)). \qquad (1)$$

Given the padded original bitmap an output continuous tone image ($A_{in}$) is initialized to be equal to O (615). Next a conditional loop in i, over the range i=1,2,3 ... n, is established in {625 and 630} to iteratively low-pass filter {635 and 645} and sub-sample {640 and 650} $A_{in}$ n times. During each iteration the low-pass filtering and sub-sampling is performed separably. First $A_{in}$ is convolved with a horizontal averaging kernel ($F_H$) (635). Next the horizontally filtered image is sub-sampled by 2 times in the horizontal direction. This process is repeated in the vertical direction using a vertically oriented averaging kernel ($F_V$) (645) and a 2 times sub-sampling process (650). After $A_{in}$ has been low-pass filtered and 2 times sub-sampled n times it is scaled one final time by the factor $2^n/R$ to its final size (655). (Note: This process illustrated here is only one example of a process to estimate the local area dot percentage of O. In the spirit of this invention, it should be recognized that other processes exist for converting a bitmap to a set of local area dot percentage estimates. As such substitution of one of these other processes should not invalidate the current invention).

As an example, using a Gaussian-shaped filter for vectors $F_H$ in (635) and $F_V$ in (645) leads to reduced artifacts, when compared to the simple averager of the same length. FIG. 3 lists a length—13 convolution filter vector. This is due in part to the fact that a two-dimensional Gaussian filter is separable into two one-dimensional filters (one vertical and one horizontal). This leads to a smooth two-dimensional filter spread function and MTF, which in turn reduces the artifacts in filtered binary images. It should be understood that the method of FIG. 3 could be employed with other separable filters, or a non-separable two-dimensional filter, without making the current invention invalid.

Figure 4A:
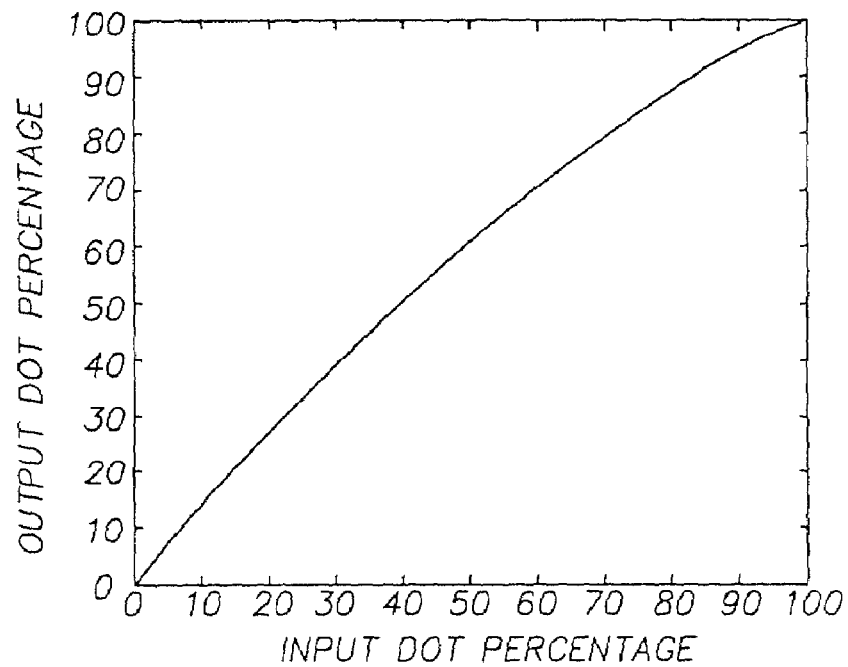
FIG. 4a is a graphical illustration of an example dot-gain function showing typical dot-in versus dot-out gain curve.
Figure 4B:
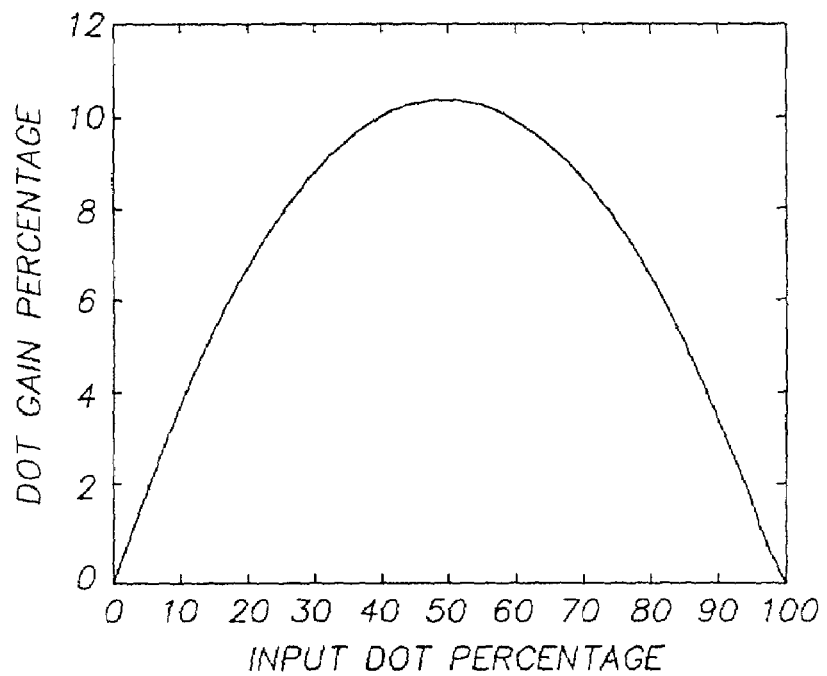
FIG. 4b is a graphical illustration of an example dot-gain function showing dot-gain percentage as a function of input dot.

Referring now to FIGS. 4a and 4b there are shown examples of dot gain functions.

FIG. 4a shows a typical dot-in versus dot-out dot-gain curve, and FIG. 4b shows a curve of dot-gain percentage as a function of input dot. (Note: The same information is present in both curves.)

Figure 5:
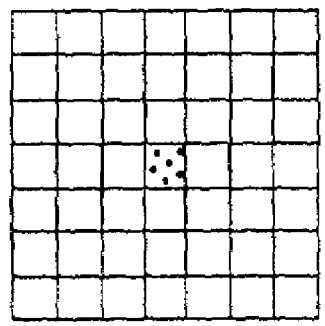
FIG. 5 is a diagrammatic view showing successive extensive morphological filtering.
Figure 5:
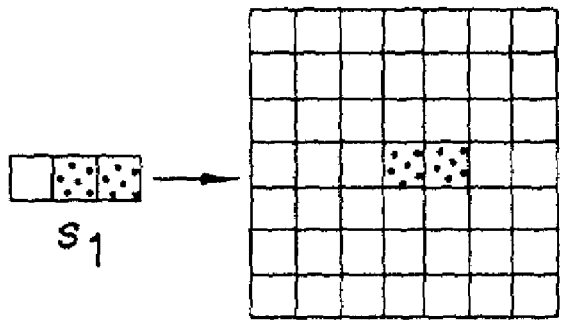
Figure 5:
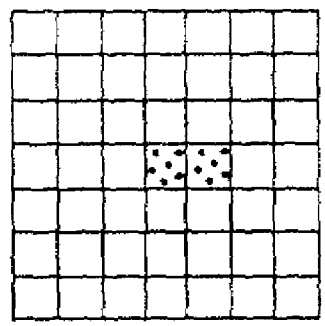
Figure 5:
Figure 5:
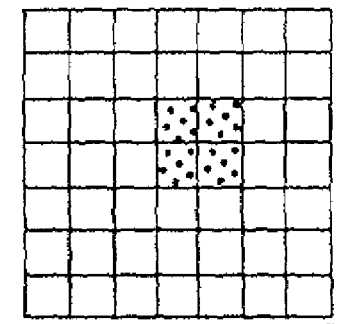

FIG. 5 illustrates how an asymmetrical structuring element, $s_1$, can be used to extend an object in a binary image O. This operation is extensive morphological filtering. An extensive operation is one where the set of input data is a subset of the output data. If this operation is repeated successively with other structuring elements, as shown with $s_2$, the resultant modified bitmap arrays will have varying amounts of additional percent dot, when compared to the input original bitmap array. Applying the same set of structuring elements in anti-extensive operations, will results in a set of bitmaps with varying amounts of reduced percent dot. An anti-extensive operation is one where the set of output data is a subset of the input data.

Figure 6:
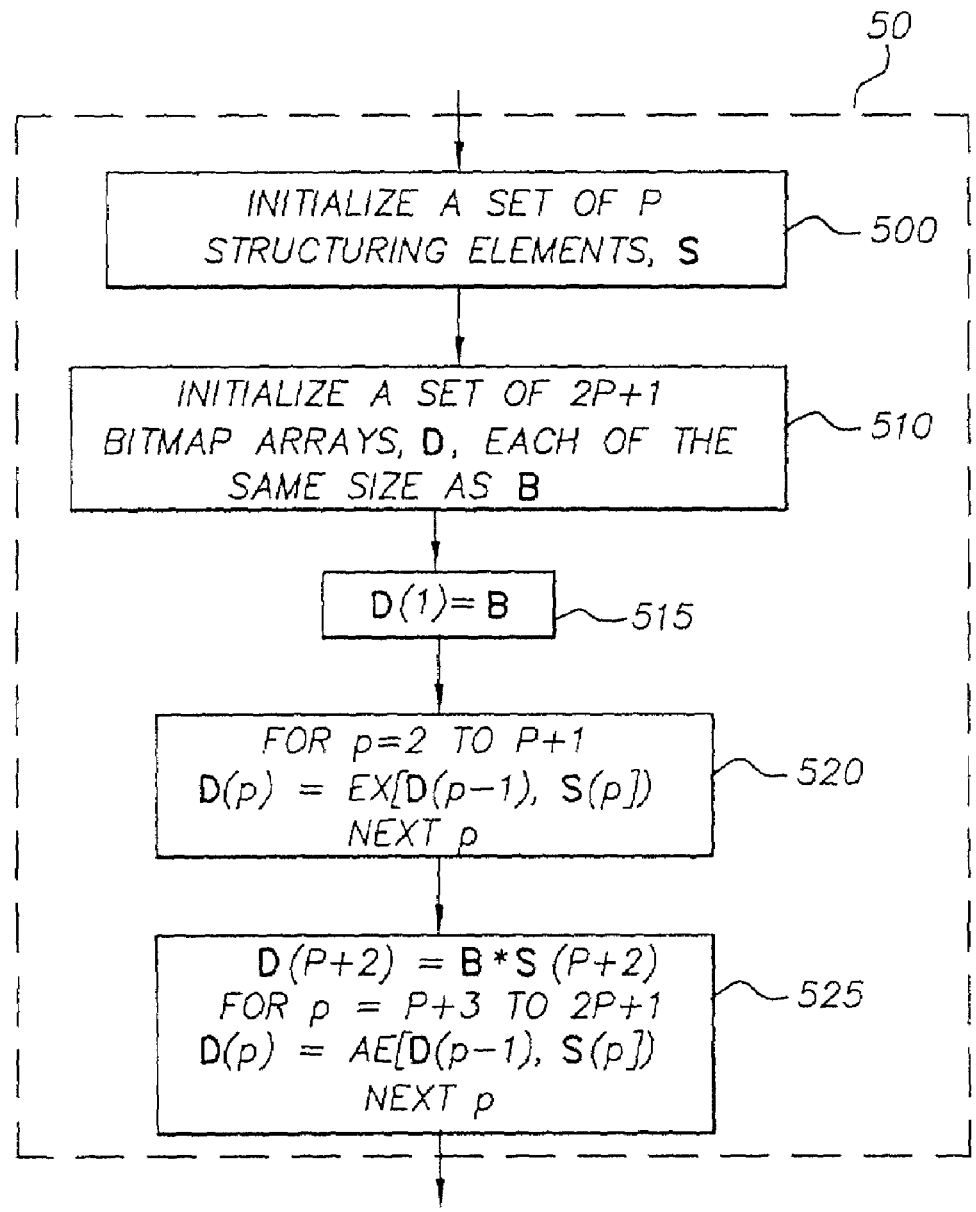
FIG. 6 is a flow diagram showing generation of modified bitmap images.

Referring to FIG. 6, there is shown in greater detail the process (50) of generating modified bitmaps by morphological filtering. Process (50) includes the following sequential steps:

| (1) | Initialize a set of P structuring elements S | (500) |
| (2) | Initialize a set of 2P + 1 bitmap arrays, D, each of the same size as B | (510) |

-continued

| | | |
|---|---|---|
| (3) | Set D(1) = B | (515) |
| (4) | For p = 2 to P + 1<br>D(p) = EX[D(p − 1), s(p)]<br>next p | (520) |
| (5) | D(P + 2) = B*S(P + 2)<br>for p = P + 3 to 2P + 1<br>D(p) = AE [D(p − 1), S(p)]<br>next p | (525) |

(Note:
EX [ ] is extensive filtering
AE [ ] is anti-extensive filtering)

Diffusion of quantization error ($\epsilon$) (60). In order to reduce the visual effects of this quantization the error $\epsilon$ can be diffused onto the neighboring pixels of $A_{aim}$ using a suitable error-diffusion scheme (60). One such scheme is error diffusion using the Floyd-Steinberg diffusion weights. (It should be recognized that this example was chosen for illustration purposes. In practice other error diffusion schemes could be used.)

One possible application for the present invention is for RIP-once-print-many systems. These are systems such as digital proofers that take in press-ready bitmap files and produce adjusted bitmap files that can be used in a digital proofing system. In this scenario the press-ready bitmap file is adjusted such that when printed on a given digital proofing system the resultant proof has the correct color and tone characteristics.

The invention has been described in detail with particular reference to certain preferred embodiments thereof, but it will be understood that variations and modifications can be effected within the spirit and scope of the invention.

PARTS LIST 10 read in bitmap file
15 estimate local dot-percentages in blocks
20 color correct using dot-gain function
25 load dot-gain function
30 initialize output bitmap B
35 initialize image block loop process and error, $\epsilon$, to zero
40 increment block number in loop
45 test if the maximum number of blocks has been reached
50 morphological filtering
55 estimate local dot-percentages for each modified bitmap in block
60 signal values compared and selection of modified bitmap w/closest dot-percentage to aim dot percentage. Output error signal, $\epsilon$
65 store selected bitmap for block j in output bitmap B
75 error diffuse $\epsilon$ on to $A_{aim}$
200 storage of output bitmap file
500 initialize a set structuring elements
510 initialize a set of bitmap arrays
515 store input bitmap array as a member of initialized bitmap arrays
520 apply set of extensive morphological filter, recursively and store results
525 apply set of anti-extensive morphological filter, recursively and store results
600 calculate down-sampling rate
605 bitmap padded to an integer multiple blocks
610 down-by-two decimations calculated
615 continuous tone image is initialized
620 set
625 conditional loop
630 conditional loop
635 horizontal averaging process
640 sub-sample
645 vertical averaging process
650 sub-sample
655 scale dimensions using bilinear interpolation

What is claimed is:

1. A method for converting an original halftone bitmap image to a color converted halftone bitmap image by morphological filtering of the original image to compensate for tone and color reproduction characteristics comprising:
   providing an original halftone bitmap image;
   providing a set of one-dimensional asymmetrical morphological filters that have a property (a) that their structuring elements are not even functions in their respective one-dimensional directions, and (b) that when they are applied recursively in order, the features in the halftone bitmap image are dilated or eroded by varying amounts by extending or reducing the edges at least in one direction, and then in another direction;
   segmenting the original halftone bitmap image into blocks and for each block:
   (a) applying said set of morphological filters to said original halftone bitmap image to produce a set of modified halftone bitmap images;
   (b) estimating a percent dot area of the original halftone bitmap image and for each of the set of modified halftone bitmap images;
   (c) applying a predetermined dot-gain to the percent dot area of the original halftone bitmap image to produce a modified percent dot area; and
   (d) from the set of modified halftone bitmap images, selecting a modified halftone bitmap image whose percent dot area is closest to the modified percent dot area to produce a block of the color corrected halftone bitmap image; and
   replacing said original halftone bitmap image with the block of the color corrected halftone bitmap image.

2. The method of claim 1 further comprises:
   calculating the difference between the percent dot area of the selected modified halftone bitmap image and the modified percent dot area of the original halftone bitmap image, to produce an error;
   diffusing the error to adjacent blocks to further modify the modified percent dot area of the original halftone bitmap image.

3. The method of claim 1 wherein said applying said set of morphological filters step produces a set of dilated and eroded halftone bitmap images.

4. The method of claim 3 further comprising:
   testing to determine whether dilation or erosion is required in order to accomplish the required dot-gain correction.

5. The method of claim 3 further comprising:
   applying each morphological filter one at a time, estimating the percent dot area of the resulting modified halftone bitmap image after each filter;
   computing the error associated with the selection of this modified halftone bitmap image; and
   determining if the next morphological filtering operation is needed in order to minimize the resultant error.

6. The method of claim 1 wherein said estimating the percent dot area of a halftone bitmap image further comprises:
   applying a linear filter followed by a 2× subsampling operation, repeatedly, until a particular net subsampling of the original halftone bitmap image is achieved.

7. The method of claim 6 wherein the particular net subsampling of the original bitmap image is approximately the size of the halftone cell of the original halftone bitmap image in units of binary pixels or dots.

* * * * *